Nov. 1, 1927.  1,647,175
G. GRUNBERG
PERFUME BOTTLE
Filed Oct. 16, 1926
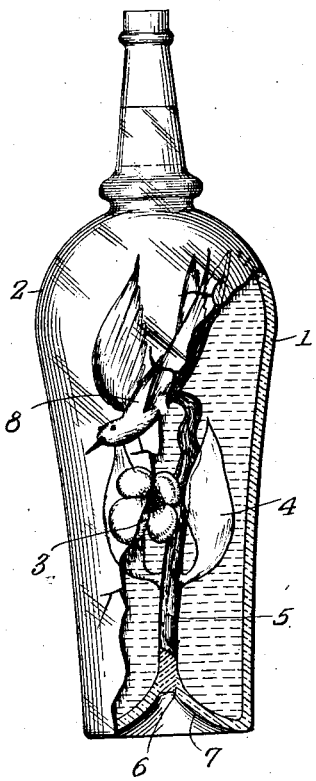
INVENTOR
George Grunberg
BY
Philip S. McLean
ATTORNEY Patented Nov. 1, 1927.

1,647,175

UNITED STATES PATENT OFFICE.

GEORGE GRUNBERG, OF NEW YORK, N. Y.

PERFUME BOTTLE.

Application filed October 16, 1926. Serial No. 141,968.

Special objects of the present invention are to provide a container for perfume or the like having ornamental features incorporated therein and forming a permanent part of the structure thereof, which features may, by their appearance, identify or suggest the contents of the container.

In certain preferred embodiments of the invention, the bottles are made of glass and artificial glass flowers are mounted within the bottles on stems integrally connected with and rising from the bottoms of the bottles. These flowers have a utilitarian as well as an ornamental value when they are of a nature to suggest or identify the contents of the bottle, for instance, to indicate different kinds of perfumes.

Other novel features of the invention will appear as the specification proceeds.

In the drawing accompanying and forming part of this specification I have illustrated in part sectional front elevation one of the many possible forms in which the invention may be embodied.

In the illustration the bottle is designated 1 and is shown as made of clear glass of an ornamental shape and having an enlarged more or less globular portion 2 to provide greater space for the internal ornamental or identifying elements.

In the particular instance shown, a flower 3 is provided with characteristic leaves 4 mounted on a flower stem or stalk 5. This stem or stalk is integrally joined at 6 to the bottom wall 7 of the vessel, which latter is shown as drawn up into the vessel to provide a reinforced base for the stem and to lift the stem clear of any support on which the bottle may rest.

The stem, flower and leaves are all of glass, preferably colored in simulation of the natural parts which they represent.

Instead of flowers, other articles such as fruits, vegetables, birds or animals having an attractive value may be mounted on the stem within the bottle. As an example, the figure of a bird 8 is shown in the position of alighting and supported on the upper end of the flower stem in the bulbous portion of the bottle above the flower and leaves.

The flowers or other display figures within the bottle are of the same permanent nature as the bottle itself, similarly unaffected by the contents of the bottle and are fixed in definite position by anchorage to the bottom of the bottle, spaced clear of the walls of the bottle and are sustained or supported to a certain extent in this relation by the surrounding body of liquid. The latter is important where the figures are of a particularly frail or fragile nature, as in the instance illustrated. Where the liquid is colored, as is the case of most perfumes, the flowers or other figures may be colored to harmonize or contrast with the liquid and in like way the color of the bottle itself may be chosen to obtain the desired final effects.

Where the figure or article within the bottle is designed to indicate the contents of the bottle, no external labels are necessary and thus the expense and uncertainty of labeling are avoided and at the same time an actually permanent identification is afforded.

What is claimed is:

1. A perfume bottle of clear glass having a flower therein indicative of the perfume, said flower being made also of glass and colored in simulation of the natural flower, said colored glass flower being supported in fixed relation in the bottle clear of the walls thereof by means of a glass stem in simulation of the stalk of such flower and integrally united with and forming a unitary extension of a portion of a wall of the bottle.

2. A container for perfume or other liquid, said container being constructed of glass, a display figure within said container, said figure being of contrasting appearance and visible through the glass walls of the container, said figure likewise being constructed of glass and integrally joined with a wall of the container, said integral connection constituting the figure an internal unitary extension of the container unaffected by and not affecting the contents of the container and said unitary connection further supporting the figure in spaced relation within the container so as to be surrounded by liquid therein.

In witness whereof, I have hereunto set my hand this 24 day of September, 1926.

GEORGE GRUNBERG.